Aug. 24, 1954   M. J. ZALESKI   2,686,932
APPARATUS FOR MAKING PLASTIC BINDERS
Filed Sept. 23, 1950   4 Sheets-Sheet 1
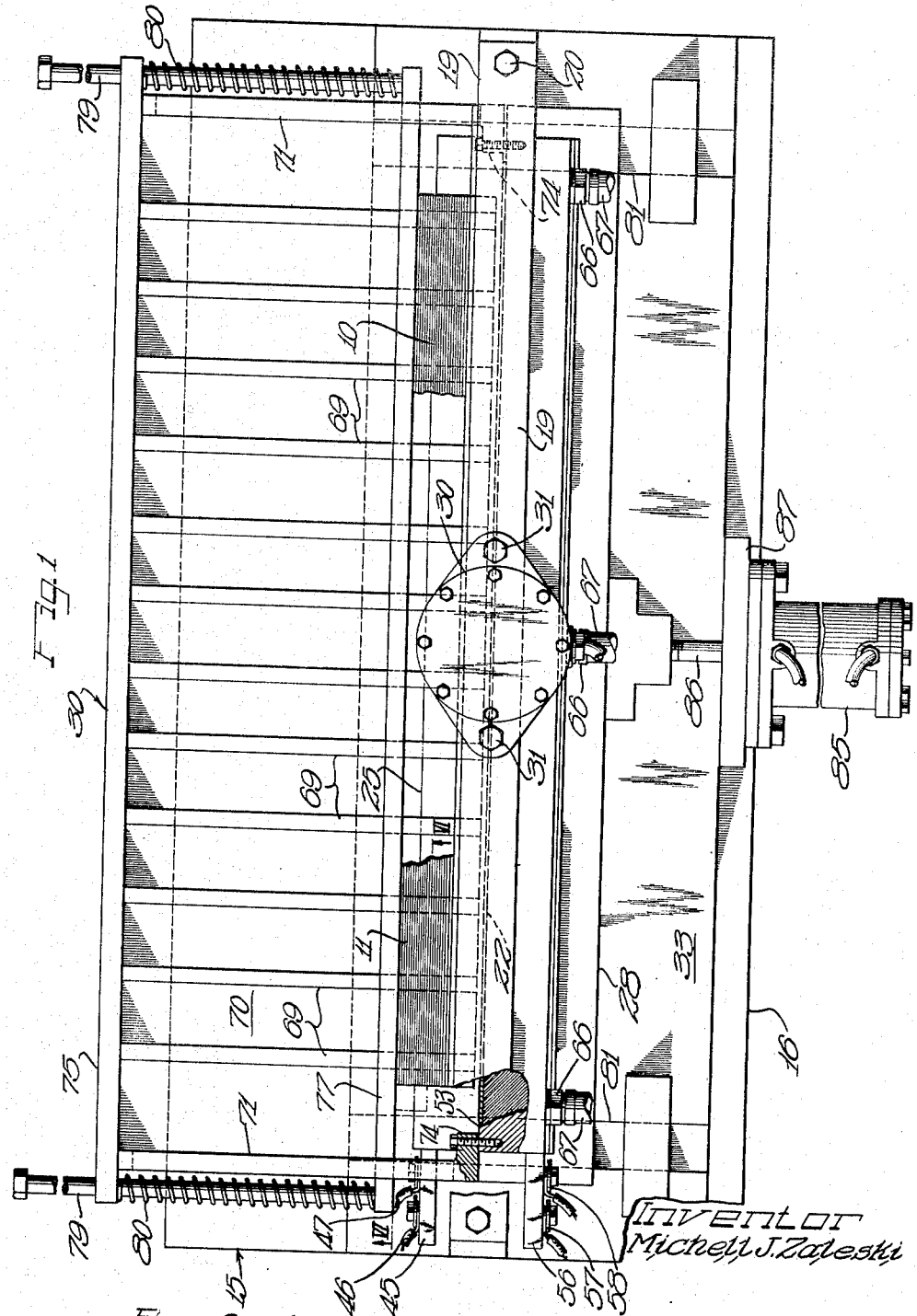
Inventor
Michell J. Zaleski

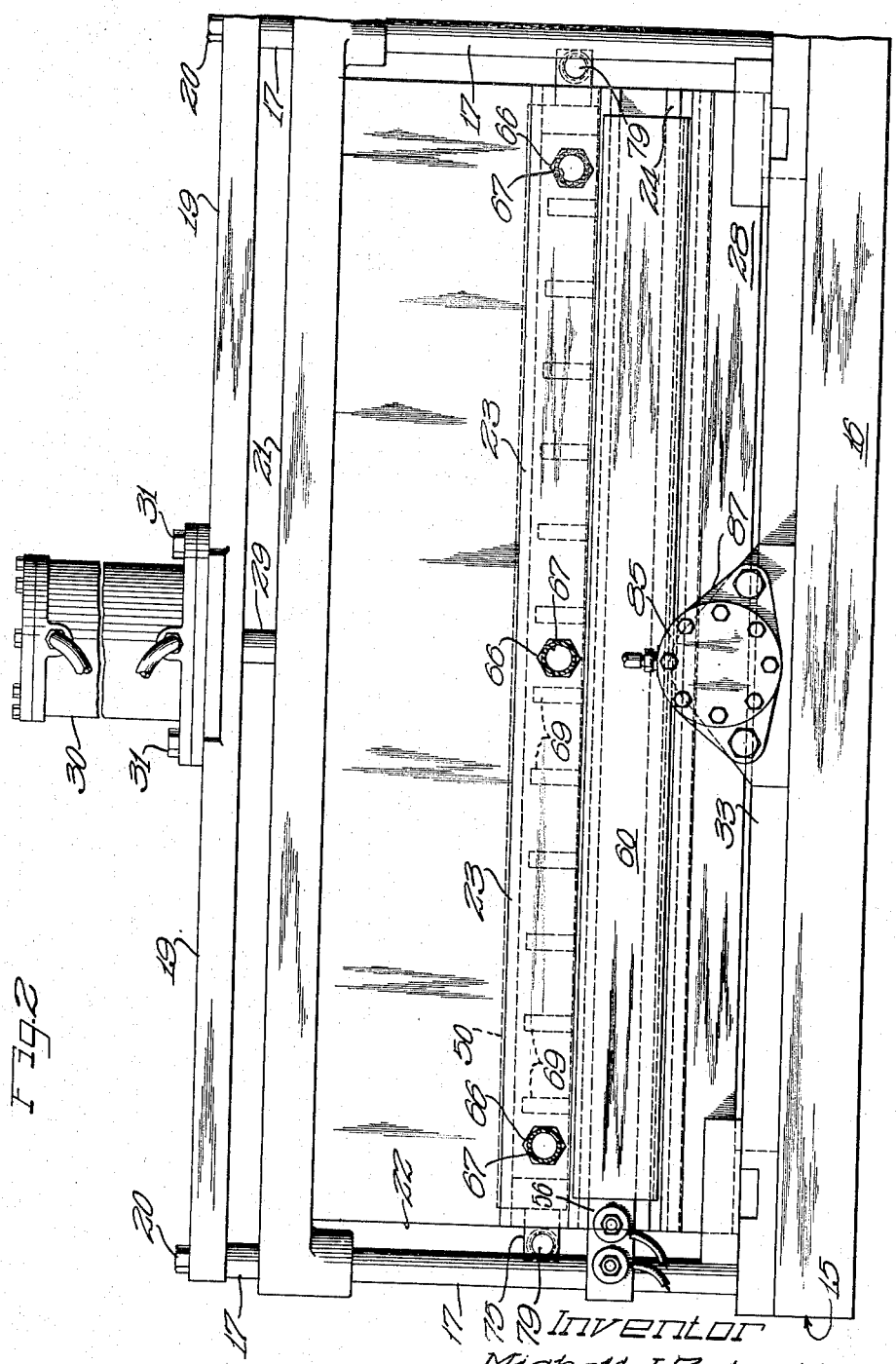

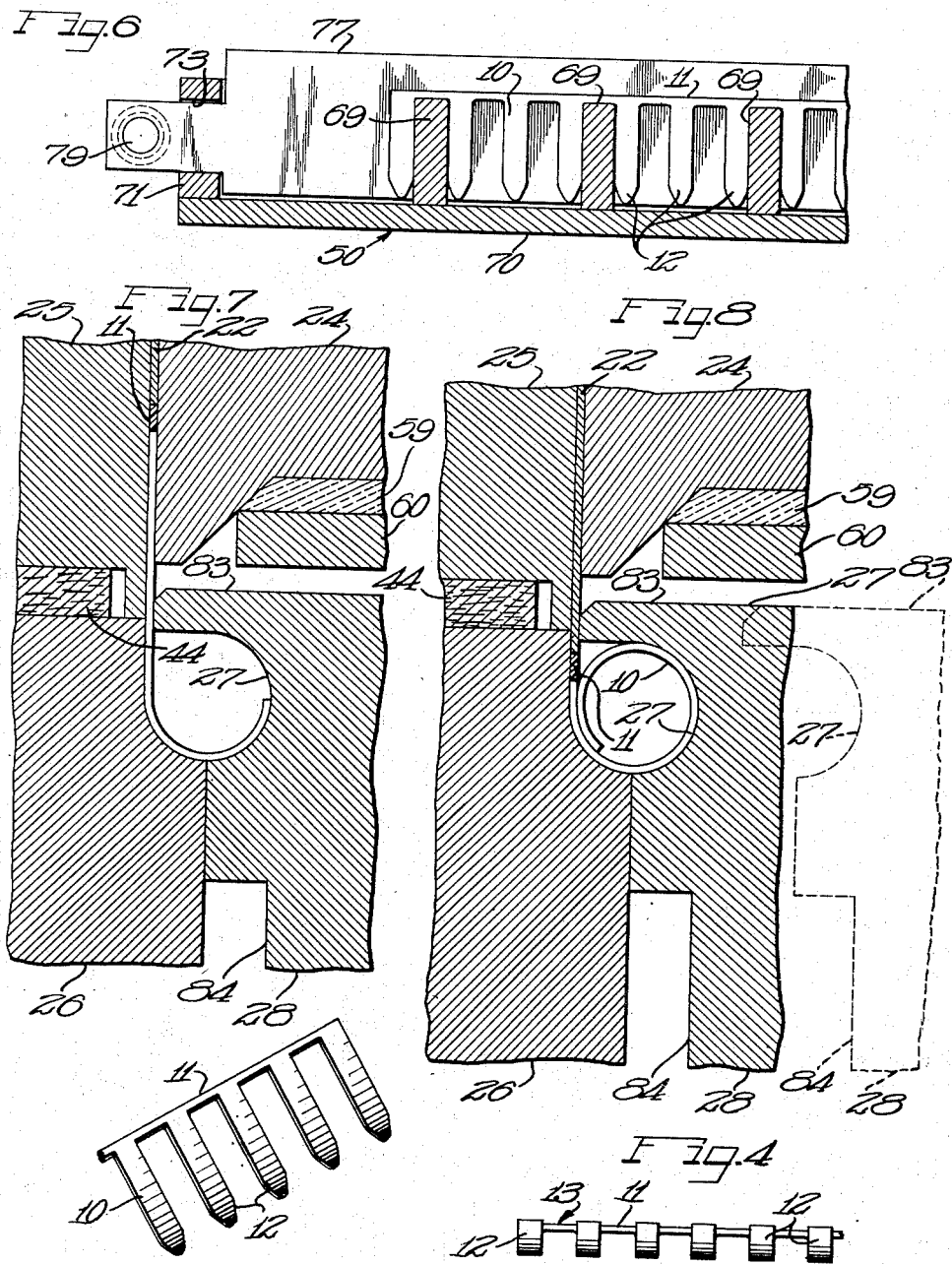

Aug. 24, 1954 M. J. ZALESKI 2,686,932
APPARATUS FOR MAKING PLASTIC BINDERS
Filed Sept. 23, 1950 4 Sheets-Sheet 4

Inventor
Mitchell J. Zaleski
By
Attys

Patented Aug. 24, 1954

2,686,932

UNITED STATES PATENT OFFICE 2,686,932

APPARATUS FOR MAKING PLASTIC BINDERS

Mitchell J. Zaleski, Chicago, Ill., assignor to General Binding Corporation, Chicago, Ill., a corporation of Illinois Application September 23, 1950, Serial No. 186,329

10 Claims. (Cl. 18—19)

This invention relates to apparatus for making plastic binders and has as its principal object to provide a new and improved apparatus for making binding elements from thermo-plastic material, free from defects and spoilage in a more efficient and expeditious manner than formerly.

Another object of my invention is to provide a new and improved apparatus for making plastic binding elements from blanks of thermo-plastic material by heating the blanks to a softening temperature and then forming the blanks to the required form and cooling and setting them as they are formed.

A further object of my invention is to provide a new and improved apparatus for making plastic binding elements or the like from thermo-plastic material in a more positive manner than formerly by the establishment of three communicating zones, the first being a storage zone, the second being the heating zone and the third being a forming and cooling zone, and in feeding a succession of comb-like blanks of thermoplastic material to successively travel from the first to the last of these zones, and curling the blanks to acquire the desired form in the last of these zones.

A further object of my invention is to provide a new and improved apparatus for making plastic binding elements free from defects and spoilage in a more efficient and expeditious manner than formerly.

A still further object of my invention is to provide a new and improved apparatus for forming plastic binding elements from comb-like blanks of thermo-plastic material, so constructed and arranged as to offer a continuous guide for the blanks terminating in a forming die, and effecting the various heating, forming and cooling operations, as the blank passes through this guide.

A still further and more detailed object of my invention is to provide a novel form of apparatus for making ring-like binding elements from comb-like blanks of thermoplastic material having a magazine feed for the blank, two spaced heating blocks in communication therewith, with the space between said blocks forming a rectilinear heating guide, and having a forming and cooling block having an initial forming surface in communication with said guide and a forming die movable into engagement with said cooling block and forming the blank to the required form, together with a power operated feed member successively feeding the blanks to acquire the desired form.

These and other objects of my invention will appear from time to time as the following specification proceeds and with reference to the accompanying drawings wherein:

Figure 1 is a top plan view of one form of apparatus constructed in accordance with my invention;

Figure 2 is a front end view of the apparatus shown in Figure 1;

Figure 3 is an enlarged fragmentary view of a comb-like blank of thermo-plastic material from which the binding elements may be formed;

Figure 4 is a view of a formed binding element;

Figure 6 is a fragmentary longitudinal sectional view taken substantially along lines VI—VI of Figure 1;

Figure 7 is an enlarged detail fragmentary transverse sectional view showing an initial stage of the operation of forming the thermo-plastic binding element; and Figure 8 is a view somewhat similar to Figure 7, but showing the final stage of the operation of forming the binding element.

As shown on the drawings:

Figure 5:
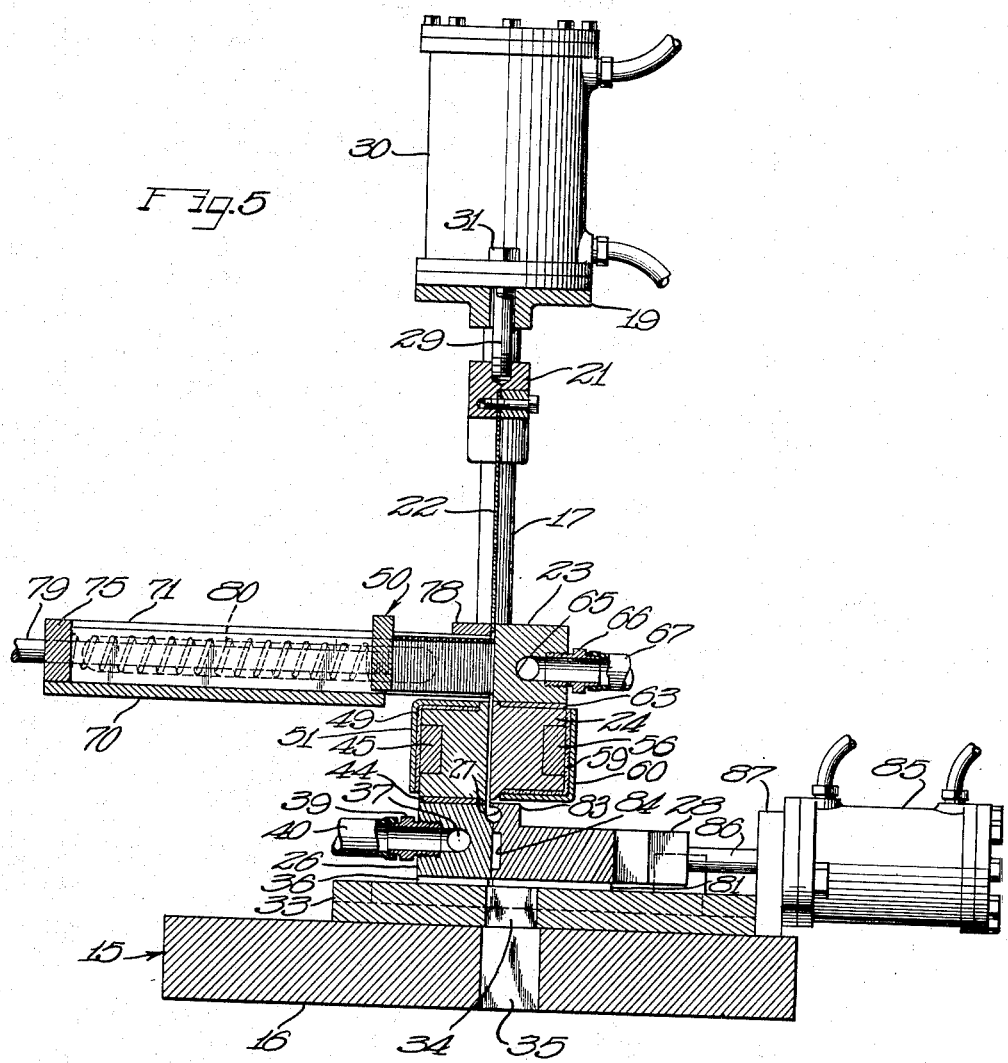
Figure 5 is a transverse sectional view taken substantially through the center of the apparatus, but showing the operating cylinder for the feed plate in full.

The comb-like blank 10 is shown in Figure 3 as having a narrow back portion 11 from which extends a plurality of parallel spaced relatively long teeth 12—12, curled by the apparatus and process of my invention into the substantially circular binding element 13 shown in Figure 4.

The blank 10 may be made from a sheet of thermoplastic material such as the vinyl chlorides or vinyl acetates, known to the trade as "Vinylite," or the cellulose acetates, butyrates and ethyl-cellulose. It may also be made of various other vinyl resins and from nylon compoundings, as well as any other suitable material desired.

The apparatus for carrying out the process of my invention, as herein shown, includes a frame 15 consisting of a base plate 16 having two parallel spaced columns 17—17 extending upwardly therefrom adjacent opposite ends thereof and connected together at their upper ends by a cross bar 19, secured thereto as by cap screws 20—20. A feed bar 21 is slidably mounted on the columns 17—17 beneath the cross bar 19 and has a feed plate 22 depending therefrom and extending therealong, for feeding an advance end blank 10 of a series of blanks in a magazine feed 50 downwardly along the face of a cooled abutment block 23 into and along a heating guide formed by the space between two parallel spaced heating blocks 24 and 25. The plate 22 then feeds the blank along an initial forming block 26 having an initial forming and cooling face in communication with said heating guide and further feeds the blank 10 to curl the blank as it is cooled to a substantially circular form within a forming die 27 formed in a die block 28.

The feed bar 21 is herein shown as having the lower end of piston rod 29 threaded therein and projecting upwardly therefrom. Said piston rod is extensible from or retractable within a fluid pressure cylinder 30 mounted on the top central portion of the cross bar 19 and extending upwardly therefrom, and secured thereto as by cap screws 31—31. The cylinder 30 is herein shown as being a double acting cylinder, and the piston therein (not shown) may be moved along said cylinder in opposite directions by the admission of fluid under pressure, such as air to the head or piston rod ends thereof under the control of suitable fluid valves (not shown), which may be manually operated by the operator of the machine. The valves for controlling the admission of release or air to the head or piston rod ends of the cylinder 30 and the source of air under pressure are not herein shown or described as they may be of various well known forms and are no part of my present invention.

A plate 33 is mounted on and extends along the top of the base 16 and has the die block 28 slidably guided for movement therealong, into and out of engagement with the forming block 26, and also forms a support for said forming block. As herein shown, the plate 33 has a slot 34 extending therealong in registry with a slot 35 formed in the base plate 16, to permit the finished binding element to drop therethrough into a suitable receptacle or conveyor, or the like (see Figure 5). The forming block 26 extends along one side of the slot 34 and is spaced a slight distance above the top of the plate 33 on spaced pads 36—36, to permit the circulation of air therebeneath. Said forming block has a passageway 37 for cooling fluid, extending therealong with a plurality of couplings 39 threaded therein and communicating with said passageway for the circulation of cooling fluid, such as water therethrough, to maintain said block cool and to cool the blank as it comes into contact with said forming block and during forming thereof. Flexible conduits 40—40 may be connected to said couplings.

The heating block 25 extends along the top surface of the forming block 26 and is suitably secured thereto. The inner end wall of the block 25 forms a continuation of a blank cooling and initial curling wall of the forming block 26. The block 25 is also shown as having a heat insulating member 44 recessed in its bottom and abutting the top surface of the forming block 26, to retain heat in said heating block, and to prevent the forming block 26 from having a cooling effect on said heating block. A heating element 45 is herein shown as being recessed within the rear wall of the heating block 25 and as extending therealong. Said heating element may be a commercial form of an electric heating element, known to the trade as a "Chromalux Heater" or may be any other form of heater desired, to heat the heating block 25 to a temperature sufficient to heat the blank 10 to a softening temperature, as said blank passes along the rectilinear heating guide between the heating blocks 24 and 25. The temperature at which the blank will soften depends upon the material from which the blank is made and the thickness thereof, and may be in the neighborhood of from 225 to 250° F., or for heavier blanks may be as high as 300°. The temperature of the heating blocks however, may be higher than this and is determined by the material being formed and the desired speed of the forming operation. Electrical terminals 46 and 47 are provided at the overhanging end of the heating element 45, to conduct current thereto. A heat insulating sheet 49 extends along the outer wall and top face of the heating block 25 and is recessed beneath the top surface of said block, to direct the heat from the heating element 45 to said block, and to prevent heat from softening the blanks in the magazine feed 50. An angular cover plate 51 covers the heat insulating member 49 and extends therealong.

The heating block 24 has inwardly extending end portions 53—53 extending inwardly from the inner face thereof and abutting opposite end portions of the heating block 25 and suitably secured thereto. A heating element 56, like the heating element 45 is recessed within and extends along the outer wall of the heating block 24, and is shown as being connected to a source of electric power by terminals 57 and 58 on an overhanging end portion thereof. The heating element 56 is insulated from the atmosphere, to retain heat within said block by means of an angular heat insulating member 59, extending along the outer side of said block and recessed within the lower portion thereof. Said insulator is retained to said block and covered by an angular cover 60 like the cover 51. Said heat insulator 59 and cover 61 also serve to keep heat away from the die block 28, along which the binding elements are formed, as they are cooled. A heat insulating strip 63 extends along the top surface of the heating block 24 and is recessed therein, a slight distance outwardly from the inner wall thereof, to retain heat within the heating block 24 and prevent undue heating of the abutment block 23.

The abutment block 23 is suitably secured to and extends along the top of the heating block 24, and its abutting face forms a continuation of the inner wall thereof. A cooling passageway 65 extends along said abutment block and communicates with couplings 66—66 threaded in said block. Fluid conductors 67—67 may be connected to said couplings, to supply cooling fluid thereto, to circulate through the passageway 65 and maintain the abutment block 23 cool, to prevent said block from heating the blank 10 adjacent its abutment surface, before entering the heating guide formed between the adjacent surfaces of the heating blocks 24 and 25.

The magazine feed 50 includes a plurality of parallel spaced rectangular blank supporting and guide bars 69—69 extending perpendicular to the abutment face of the abutment block 23. The bars 69—69 are of a width sufficient to extend within certain spaces between the teeth 12—12 of the blanks 10 and support said blanks for sliding movement therealong into successive registry with the slot or heating guide between the heating blocks 24 and 25. The guide bars 69—69 are mounted on and extend upwardly and inwardly from a plate 70, spaced outwardly from the heating block 25 and secured to the abutment block 23, adjacent its opposite ends on support members 71—71, having rectilinear slotted guides 73—73 extending therealong. The support members 71—71 each have an inwardly extending foot 74 abutting the abutment face of the abutment block 23, and suitably secured thereto, as by machine screws. A bar 75 extends upwardly from the outer side of the plate 70 and upwardly along the outer ends of the support and guide bars 69—69, and beyond opposite ends of the support members 71—71. A feed bar 77 is adapted to abut the outermost blank of the magazine of blanks, and is slidably guided on the blank supporting and guide bars 69—69, and extends downwardly therealong and has reduced end portions extending through the slotted guides 73—73 in the support members 71—71, and outwardly therefrom. Rods 79—79 are herein shown as being threaded in the opposite outer end portions of the feed bar 77 and extend outwardly in the direction of the support members 71—71 and extend through and have sliding engagement with the outwardly projecting end portions of the bar 75. Compression springs 80—80 encircle said guide rods and are interposed between the inner side of the bar 75 and outside of the feed bar 77, and urge said feed bar towards the abutment block 23. The magazine 50 may thus supply blanks slidably mounted on the support and guide bars 71—71 to the heating guide formed between the adjacent end faces of the heating blocks 24 and 25, in an obvious manner.

A guide strip 78 is secured at its ends to the support members 71—71, in spaced relation with respect to the abutment face of the block 23, and with said abutment face forms an aligning guide for the feed plate 22.

The die block 28 is slidably mounted for engagement with the forming block 26 on spaced bearing pads 81—81 extending along opposite sides of the plate 33, and spacing the die block 28 above the top of the plate 33, to provide for the circulation of air therebeneath. The die block 28 has an upwardly projecting inner end portion 83, having the semi-cylindrical die 27 recessed therein and forming a continuation of the initial curling surface of the forming block 26. The die 27 terminates at its inner upper end, beneath and in alignment with the heating and guide face of the heating block 24, to guide the heated blank to pass along the curling surface of the forming block into said die 27, for forming. The die block 28 also has a recessed portion 84 facing the cooling block 26 for the circulation of air therethrough, to aid in the cooling of said die block. If desired, cooling passageways (not shown) for the circulation of cooling fluid may be provided in said die block to aid in cooling thereof. It has been found, however, that with the usual blank it is not necessary to cool the die block 27 by water, the insulation afforded by the insulating member 49 and the circulation of air around said die block together with contact with the water cooled, forming block 26, being sufficient to maintain the die block 28 at a low enough temperature to cool the blank curled in the forming block 26 and die 27 as it is formed.

A double acting fluid pressure cylinder 85 having a piston rod 86 extensible therefrom and connected at its free end to the die block 28 is provided to hold said die block into engagement with the forming block 26 during the forming operation and to move said die block away from said forming block immediately after the forming operation, to allow the formed and set binding element to drop through the slots 34 and 25. The cylinder 85 may be a well known form of air cylinder, the admission and release of air to opposite ends thereof being under the control of the operator of the machine by suitable valve means (not shown). The cylinder 85 projects outwardly from the base 16, and is mounted at its piston rod end on an upright bracket member 87, projecting upwardly from the base 16, and abutting the outer side of the plate 33.

In carrying out the process of my invention, the individual blanks 10—10 may first be formed by a cutting or blanking operation. The formed blanks may then be loaded on the support and guide bars 69—69 in the manner shown in Figure 6. The die block 28 may be moved into engagement with the forming block 26, to close the cooling die, by the admission of air under pressure to the head end of the cylinder 85. The compression springs 80—80, holding ethe advance blank in engagement with the abutment face of the abutment block 23, and the piston rod 29 being in a retracted position, fluid under pressure may be admitted to the head end of the cylinder 30, to extend said piston rod therefrom and engage the feed plate 22 with the top surface of the back 11 of the advance blank 10. The continued admission of air under pressure to the head end of the cylinder will feed the relatively cool advance blank downwardly into the heating guide formed between the adjacent end surfaces of the heating blocks 24 and 25. The heat in the blocks 24 and 25 being of the proper temperature to soften the blank, and being maintained at this temperature by suitable thermostatic controls (not shown), the blocks 24 and 25 will progressively heat the blank to a softening temperature as it passes therebetween. Further downward movement of the feed plate 22 will advance the teeth 12—12 of the blank along the initial curling surface of the forming block 26 to cool and initially curl the leading ends of the teeth of the blank, progressively setting the teeth as they are curled. Continued downward movement of the feed plate 22 will continue the curling operation, as shown in Figure 7, where the teeth are of a substantially semi-circular form, moving upwardly along the curved face of the curling die 27. Feeding movement of the feed plate 22 may be continued until the feed plate 22 enters the space between the forming block and inner edge of the curling die, completely curling the blank to a circular form, with an overlapping back 11, shown as projecting outwardly therefrom a slight distance, but which may completely overlap the blank if desired. By the time the leading ends of the teeth reach the curling die 27, they have acquired their set, and will continue to travel in a circular path, as the feeding operation is continued, underlapping the trailing ends of the teeth. As soon as the feed plate 22 reaches the end of its feeding stroke, fluid under pressure may be admitted to the piston rod end of the cylinder 85 to retractably move the die plate 28 into the position shown by broken lines in Figure 8, and allow the formed binding element 13 to drop in the space between said forming die and forming block, through the slots 34 and 35. Fluid under pressure may then be admitted to the piston rod end of the cylinder 30, to raise the feed plate 22 to the position shown in Figure 5. As the same time, fluid under pressure may be admitted to the head end of the cylinder 85 to close the die, and may be held therein to hold said die in a closed position for curling the next binding element.

It may be seen from the foregoing that simple novel and improved apparatus and process has been provided for forming plastic binding elements from comb-like blanks of thermo-plastic material, which contemplates storing the blanks in a magazine, successively feeding the blanks for progressive heating and then forming the blanks as they are being cooled and set, and then releasing the formed and set blanks.

It may further be seen that with the apparatus and process of my invention, the blank is progressively set as it is formed, so that by the time the feeding plate 22 has reached the end of its feeding stroke, the blank has acquired its final set and may immediately be discharged from the forming die in the form of a complete fully set binding element, resulting in a faster forming operation than formerly by eliminating the time formerly required to allow the blank to set and cool in processes where the blanks are formed while hot and are heated during the entire forming operation.

It may further be seen that the heating forming and cooling operations may all be accurately controlled, and that the apparatus is of a simple and efficient form which may readily be operated by unskilled help with little if any spoilage of the blanks being formed.

It will be understood that modifications and variations may be effected without departing from the scope of the novel concepts of the present invention.

I claim as my invention:

1. In an apparatus for making binding elements from comb-like plastic blanks, a frame, two spaced heating blocks mounted thereon and having facing adjacent rectilinear guide surfaces forming a heating guide for the blanks, means engageable with the blank to feed the blank along said heating and guide surfaces, a forming and cooling block having an initial forming surface in alignment with one of said heating and guide surfaces, and a forming die movable into engagement with said forming block and having a final forming surface forming a continuation of said initial forming surface of said forming block.

2. In an apparatus for making binding elements from comb-like plastic blanks, a frame, two spaced heating blocks mounted thereon and having facing adjacent rectilinear guide surfaces forming a heating guide for the blanks, means engageable with a blank to feed the blank along said heating guide, a forming block having an initial forming surface in alignment with the facing guide surface of one of said heating blocks, a forming die movable into engagement with said forming block and having a final forming surface forming a continuation of said initial forming surface, and a power operated member for positively holding said forming die in engagement with said forming block, and selectively operable to move said die away from said block, to release the formed binding element.

3. In an apparatus for making binding elements from comb-like plastic blanks, a frame, two spaced blocks mounted thereon, a heating element mounted within each of said blocks, the adjacent surfaces of said blocks being parallel plane surfaces and the space therebetween forming a rectilinear guide for the blanks and heating the blank as it passes therethrough, a block having an initial forming surface in alignment with one side of said guide, said block having passageways therein for the circulation of cooling fluid, and a forming die mounted on said frame for movement into engagement with said last mentioned block and having a blank curling surface forming a continuation of said initial forming surface.

4. In an apparatus for making binding elements from comb-like plastic blanks, a frame, two spaced blocks mounted thereon, a heating element mounted within each of said blocks, the adjacent surfaces of said blocks being parallel plane surfaces and the space therebetween forming a rectilinear guide for the blanks and the sides thereof heating each blank as it passes therethrough, a block having an initial forming surface in alignment with one side of said guide, said block having passageways therein for the circulation of cooling fluid, and a forming die mounted on said frame for movement into engagement with said forming block and having a blank curling surface forming a continuation of said initial forming surface, a cylinder on said frame having a piston rod extensible therefrom, and an operative connection between said piston rod and forming die, holding said die in engagement with said associated block for forming the binding element and moving said die away therefrom, to allow the formed binding element to drop therefrom.

5. An apparatus for making binding elements from comb-like plastic blanks comprising a frame, a rectilinear guide on said frame, and forming a blank storage compartment and a guide means for the stored blanks, an abutment member at the discharge end of said guide perpendicular to the path of travel of the binding elements along said guide, two spaced heating blocks disposed beneath said abutment member, one being aligned with the abutment surface of said abutment member and the other being spaced therefrom to form a blank receiving slot, a forming and cooling block beneath one of said heating blocks and having an initial blank curling surface in communication with said slot, and a curling die movable into engagement with said forming block and having a final curling surface in communication with the curling surface of said forming die.

6. An apparatus for making binding elements from comb-like plastic blanks comprising a frame, guide means on said frame for a plurality of comb-like plastic blanks, a feed bar engaging said blanks, an abutment member facing said feed bar and having a plane abutment face perpendicular to the path of travel of the blanks along said guide means and forming a stationary abutment surface for the advance blank, two spaced heating blocks having adjacent facing parallel plane surfaces, the face of one of said blocks forming a continuation of the abutment face of said abutment member and the face of said other block being spaced therefrom and with said first block forming a rectilinear heating guide for the blank, a pusher member slidable along the abutment face of said abutment member through the space between said blocks and feeding the blanks into said heating guide, a forming and cooling block disposed at the discharge side of said heating guide, and a curling die movable into engagement with said forming block and having a curling forming surface in communication with said forming block and said heating guide.

7. An apparatus for making binding elements from comb-like plastic blanks comprising a frame, guide means on said frame for a plurality of comb-like plastic blanks, a feed bar engaging said blanks, an abutment member facing said feed bar and having a plane abutment face forming a stationary abutment surface for said blanks, two spaced heating blocks having adjacent facing parallel plane surfaces, the face of one of said blocks forming a continuation of the abutment face of said abutment member and the face of said other block being spaced therefrom and with said other block forming a rectilinear heating guide for the blanks, a pusher member slidable along the abutment face of said abutment member and feeding the blanks into and through said heating guide, a forming and cooling block disposed at the discharge side of said heating guide, a curling die engageable with said forming block and having a curling forming surface in communication with said forming block and said heating guide, and a power operated member holding said curling die in engagement with said forming block and selectively operable to move said curling die toward and from said forming block.

8. An apparatus for making binding elements from comb-like plastic blanks comprising a frame, guide means on said frame for a plurality of comb-like plastic blanks, a feed bar engaging the outermost blank of said blanks, an abutment member facing said feed bar and having a plane abutment face forming a stationary abutment surface for the innermost blank of said blanks, two spaced heating blocks having adjacent facing parallel plane surfaces, the face of one of said blocks forming a continuation of the abutment face of said abutment member and the face of said other block being spaced therefrom and with said other guide forming a rectilinear heating guide for the blanks, a pusher member slidable along the abutment face of said abutment member and operable to feed the blanks into and through said heating guide, a forming and cooling block disposed at the discharge side of said heating guide, a curling die engageable with said forming block and having a curling forming surface in communication with said forming block and said heating guide, a fluid pressure cylinder mounted on said frame, and a piston rod extensible therefrom and secured to said curling die to hold said curling die in engagement with said forming block and move said curling die toward and from said forming block.

9. An apparatus for making binding elements from comb-like plastic blanks comprising a frame, magazine feed means for the blanks on said frame including a plurality of parallel spaced blank supporting bars extending between the teeth thereof and having the blanks slidably mounted thereon, an abutment member at the discharge end of said bars and having a plane abutment face forming a stationary abutment surface for the innermost blank of said blanks, a feed bar engageable with the outermost blank of said blanks, yieldable means urging said feed bar toward said abutment member, two spaced heating blocks having adjacent facing parallel plane surfaces, the face of one of said blocks forming a continuation of the abutment face of said abutment member and with the parallel spaced face of said other block forming a rectilinear heating guide for the successive blanks, a pusher plate guided to slide along the abutment face of said abutment member and into and along said heating guide, to feed the blanks into and through said heating guide, a forming and cooling block at the discharge side of said heating guide, a curling die engageable with said forming block and having a curling forming surface in communication with said forming block and said heating guide, and power means for holding said curling die in engagement with said forming block during the forming operation, and disengaging said curling die therefrom, to allow the formed binding element to drop therefrom.

10. An apparatus for making binding elements from comb-like plastic blanks comprising a frame, magazine feed means for the blanks on said frame including a plurality of parallel spaced blank supporting bars extending between the teeth thereof and having the blanks slidably mounted thereon, an abutment member at the discharge end of said bars and having a plane abutment face forming a stationary abutment surface for said blanks, a feed bar engageable with said blanks, yieldable means urging said feed bar toward said abutment member, two spaced heating blocks having adjacent facing parallel plane surfaces, the face of one of said blocks forming a continuation of the abutment face of said abutment member and with the parallel spaced face of said other block forming a rectilinear heating guide for the successive blanks, a pusher plate guided to slide along the abutment face of said abutment member and into and along said heating guide, a forming and cooling block at the discharge side of said heating guide, a curling die engageable with said forming block and having a curling forming surface in communication with said forming block and said heating guide, a power operated member selectively operable to move said pusher plate along said abutment face and through said heating guide, to effect the heating and forming operation of the blank, another power operated member holding said curling die in engagement with said forming block and selectively operable to move said curling die toward and from said forming block, and a discharge opening for the formed blanks in said frame, operable to discharge the formed blanks from said frame upon disengagement of said curling die from said forming block.

References Cited in the file of this patent

UNITED STATES PATENTS

| Number | Name | Date |
|---|---|---|
| 523,073 | Juergens | July 17, 1894 |
| 2,211,743 | Nelson et al. | Aug. 13, 1940 |
| 2,211,744 | Nelson et al. | Aug. 13, 1940 |
| 2,273,824 | Barrett | Feb. 24, 1942 |
| 2,304,629 | Emmer | Dec. 8, 1942 |
| 2,403,644 | Emmer | July 9, 1946 |
| 2,491,527 | Spinner | Dec. 20, 1949 |